United States Patent [19]
Malacarne

[11] Patent Number: 5,438,641
[45] Date of Patent: Aug. 1, 1995

[54] OPTICAL FIBER COMPONENT CASSETTE WITH PIGTAIL TUBE ASSEMBLY

[75] Inventor: Fabien Malacarne, Fontainebleau, France

[73] Assignee: Corning Incorporated, Corning, N.Y.

[21] Appl. No.: 199,084

[22] Filed: Feb. 22, 1994

[30] Foreign Application Priority Data

Mar. 26, 1993 [FR] France ................. 93 03523

[51] Int. Cl.⁶ ................................ G02B 6/36
[52] U.S. Cl. ...................... 385/137; 385/135
[58] Field of Search ................. 385/134–137

[56] References Cited

U.S. PATENT DOCUMENTS

| | | | |
|---|---|---|---|
| 4,171,867 | 10/1979 | Cocito | 385/135 |
| 4,359,262 | 11/1982 | Dolan | 385/135 |
| 4,648,168 | 3/1987 | Nolf et al. | 385/135 |
| 5,052,773 | 10/1991 | Noon et al. | 385/136 |
| 5,074,635 | 12/1991 | Justice et al. | 385/135 X |
| 5,121,458 | 6/1992 | Nilsson et al. | 385/135 X |
| 5,323,480 | 6/1994 | Mullaney et al. | 385/135 |

FOREIGN PATENT DOCUMENTS 0270479 6/1988 European Pat. Off. .
0355639 2/1990 European Pat. Off. .
2670303 6/1992 France .
9210644 10/1992 Germany .

OTHER PUBLICATIONS

IBM Technical Disclosure Bulletin, vol. 34, No. 8, Jan. 1992, New York, pp. 407–408 "Duplex Fiber-Optic Splice Housing".

Primary Examiner—John D. Lee
Attorney, Agent, or Firm—Cabinet De Boisse; Jay M. Brown

[57] ABSTRACT

Cassette for containing an optical fiber-containing device, having a bundle of optical fibers extending out of the cassette, comprising means ($9_i$) to attach an end of the bundle onto the cassette and a hardened adhesive product (13) in order to rigidify this end of the bundle of tubes ($11_i$) following a stable geometrical configuration suitable for withstanding mechanical bending capable of generating curvature losses in optical signals transmitted through the fibers. The cassette has particular applicability to housing integrated optical components comprising optical fibers, for use in telecommunication networks.

8 Claims, 2 Drawing Sheets

OPTICAL FIBER COMPONENT CASSETTE WITH PIGTAIL TUBE ASSEMBLY

The present invention relates to a cassette for an optical fiber device and, more particularly, such a cassette equipped with a bundle of tubes protecting the fibers extending from the cassette and with means to fasten an end of this bundle onto the cassette.

Figure 1:
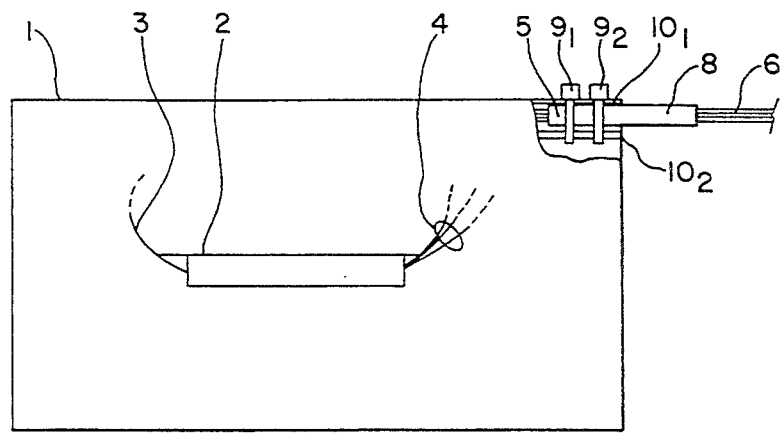

For installing optical fiber telecommunication networks, it has been proposed to use cassettes of the type represented in FIG. 1 of the attached drawings. The cassette 1 is conceived to protect and to allow handling of an optical component 2 such as for example a $1 \times N$ coupler embodied in integrated optics.

The optical fiber 3 extending out of one side of such a coupler and the N optical fibers 4 extending out of the other side of this coupler are guided, following paths of predetermined curvature, towards the end 5 of a bundle 6 of (N+1) tubes, each of them protecting the part of one of the fibers extending out of the cassette, as represented in the partially cut-away view of FIG. 1.

It is advisable to ensure at the same time the attachment of the end 5 of the bundle onto the cassette and of each fiber in its own tube in order that tensions applied to the tube or the fiber will not disrupt the bundle/cassette attachment or shift the component 2 in the cassette. As it appears in the scheme of FIG. 2 of the attached drawings that represents a longitudinal section of the end of the bundle of fibers, the fiber 3, for example, is attached in its tube by a drop 7 of an adhesive product deposited at the mouth of the tube and drawn up into the tube by capillary attraction.

In order to attach the bundle of tubes to the cassette, a flexible protective sleeve 8 is passed over the end of the bundle, and one or several straps $9_1$, $9_2$ (FIG. 1) passing around the end 5 of the bundle and around walls $10_1$, $10_2$ formed into the cassette and defining a path for the bundle, are tightened around this bundle and these walls.

Figure 2:
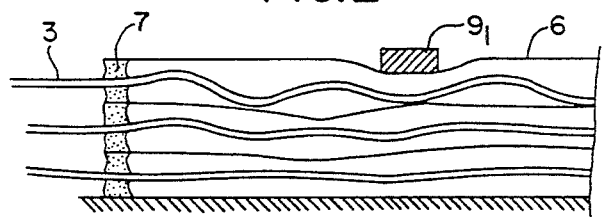

Cassettes constituted in this way are submitted to standard heating/cooling cycles, in order to verify their ability of properly operating at any outside temperatures, comprising between $-40°$ C. and $85°$ C. for example. During these tests, optical signal losses passing through the component are monitored. During these tests, it has been noticed that the structure of the attachment of the bundle of tubes described above was generating losses, notably at low temperatures ($-40°$ C.). In effect, as illustrated in FIG. 2, the contraction of the tube that is observed at low temperatures, between the adhesive drop 7 and the strap $9_1$ for example, generates strong local microcurves of the fiber 3, causing strong losses of optical signal, losses that can commonly reach 1 dB for a signal with a standard wavelength of 1550 nm.

The present invention has therefore as its aim the provision of a cassette of the type described above, perfected in order to eliminate the curvature losses induced by the cassette, in the conditions of extreme temperatures mentioned above.

The present invention has also as its object the provision of such a perfected cassette, without noticeably modifying its manufacturing cost price.

These objects of the invention, as well as others which will appear from reading the following description, are achieved with a cassette for an optical fiber device provided with a bundle of flexible tubes protecting the fibers extending from the cassette, and with means to attach an end of this bundle onto the cassette, the cassette being remarkable in that it comprises a means to rigidify this end of the bundle of tubes following a stable geometrical configuration suitable for withstanding mechanical bending which can generate curvature losses for the optical signals transmitted through the fibers.

According to a preferred mode provided by the present invention, this stable configuration takes the form of a compact arrangement of tubes in planar beds optionally superposed, the arrangement being held in place by a hardened adhesive product filling the gaps between the tubes.

Figure 3:
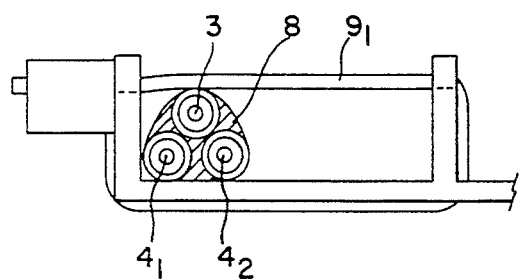
Figure 4:
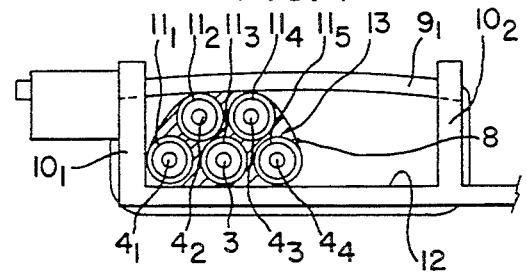
Figure 5:
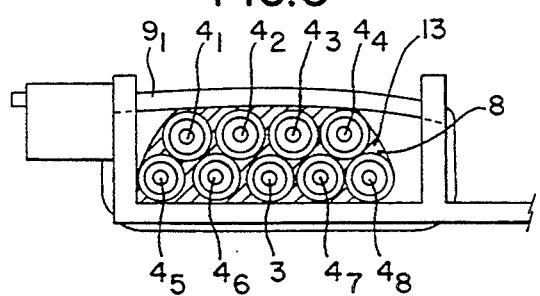
Figure 6:
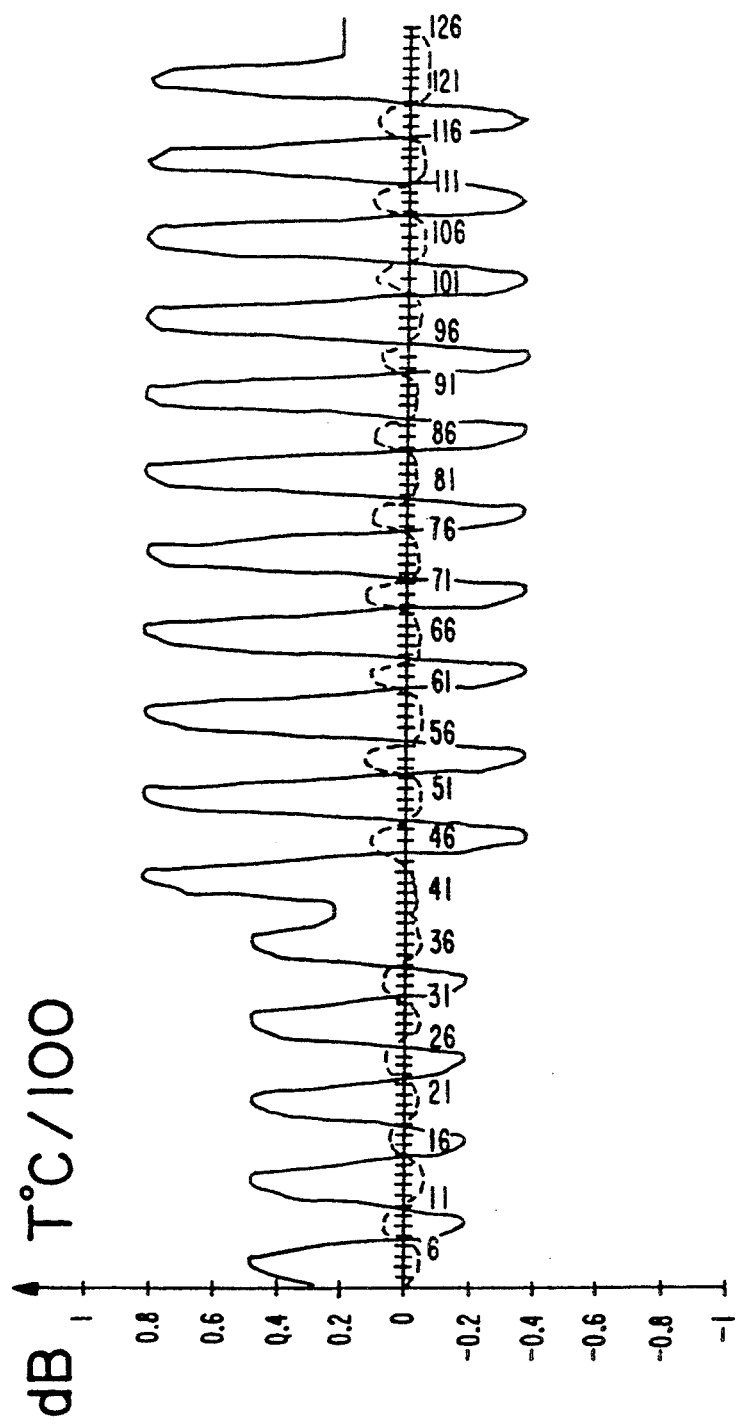

Other characteristics and advantages of the present invention will appear upon reading the following description and upon examination of the attached figures in which:

FIGS. 1 and 2 are diagrams already described at the beginning of the present description, FIGS. 3 to 5 are transversal sections of three structures of ends of bundles of tubes, that can be used in a cassette in accordance with the present invention, and FIG. 6 is a graphical representation of the heating-/cooling cycles applied to the cassette in accordance with the invention, and of the attenuation of optical signals transmitted through a coupler installed in the cassette in accordance with the invention.

We refer to FIGS. 3 to 5 of the attached drawings and in particular to figure that represents a transversal section of the end of a bundle of flexible tubes $11_1$, $11_2$, $11_3$, $11_4$, $11_5$ packed against each other into a protective sleeve 8, and protecting the optical fibers $4_1$, $4_2$, $4_3$, $4_4$ respectively, each of them passing freely in the associated flexible tube. Such an arrangement corresponds to a cassette containing a $1 \times 4$ coupler, in integrated optics for example, the five optical fibers connected to this coupler extending from the cassette together after having followed, inside the cassette, paths with low curvatures (not represented in FIG. 1) suitable for minimizing the curvature losses on these paths.

According to the present invention, the five tubes are organized in two superposed planar beds of respectively two and three tubes. They are held in this configuration by a coating with a hardened adhesive product 13 filling all the gaps between the tubes.

To do so, the end of the bundle of tubes is coated with a drop of a predetermined volume of an adhesive product in a fluid state, this product then interposing itself between the tubes and which, after hardening, ensures the cohesion of the compact arrangement of tubes constituted in this way; the arrangement then being rigidified in a geometrical configuration, both transversely and longitudinally stable.

Various rigid adhesive products can be used to achieve this outcome, notably fast setting cyanoacrylate-based products.

Optionally, the end of the bundle of tubes rigidified in this way can be inserted into a plastic flexible protective sleeve 8 glued to this end, for example with the help of the same adhesive product as that used to bind the tubes together.

The various fibers of the optical component 2 are then slipped into the ends of the tubes $11_i$ (i=1 to 5) and glued to them by drops 7 of an appropriate adhesive product, drawn up into the tubes by capillary attraction as seen above. For illustration purpose only, the fibers can be of a "single mode" type and present a diameter of 0.25 mm, the associated protecting tubes 11, having an inner diameter of 0.5 mm and an outer diameter of about 1 mm.

The end 5 of the bundle is then glued onto a surface 12 of the bottom of the cassette, framed by two walls $10_1$, $10_2$ delimiting on this bottom a housing for this end. According to the invention, the surface 12 is approximately planar, and without indentations in order to do away with any point of concentrating forces between the bundle of tubes and the receiving surface.

One or more straps $9_1$, $9_2$ are finally tightened around the end of the bundle of tubes and around the walls $10_1$, $10_2$ in order to perfect the attachment of the end onto the cassette, by notably increasing its resistance to a pulling-out stress perpendicular to the bottom 12.

The rigidification of the end of the bundle of tubes achieved by the present invention is advantageous. It allows the bundle to withstand compression stresses exerted by the straps, that could result in microcurvatures of the fiber. In this respect, the compression stress can be reduced again by appropriately dimensioning the height of the walls $10_1$, $10_2$ so that the straps are flush with the bundle. In any case, planar straps, such as represented in FIG. 2, are preferably used in order to ensure a better distribution of the compression stresses. It appears that the rigidification of the end of the bundle of tubes achieved in accordance with the invention permits one to avoid the possibility that the compression stresses be entirely absorbed by the tubes directly facing each strap, these stresses being on the contrary dispersed throughout the mass of the end of the bundle, resulting in reduced strains on each point of the bundle end.

In FIGS. 3 and 5, other embodiments of the invention suitable for cassettes containing respectively 1×2 and 1×8 couplers have been represented. They take up all the characteristics detailed above for the cassette with a 1×4 coupler partially represented in FIG. 4, only the number of tubes of each bed of tubes varying from one embodiment to another. Applying the principles exposed above, one could extend the invention to cassettes for 1×16 or 1×32 etc. couplers; or to integrated optical components of other types, such as proximity couplers for example, or also to classical—non integrated—optical components.

As seen above, the fibers should follow paths with low curvature between the end of the bundle of tubes and the optical component 2, in order precisely to limit curvature losses. In this respect, it would be proper that the fibers spread out of the end of the tubes without constraint in the direction of the component, following parts of a path with low curvature, as close as possible to rectilinear parts.

The graphs in FIG. 6 illustrate the results obtained by implementing the present invention. The heating/cooling cycles of the cassette have been represented with continuous lines: they consist of four initial cycles where the temperature varies between −20° C. and +50° C., followed by ten cycles where the temperature varies between −40° C. and +85° C., the whole process lasting 126 hours.

Submitting a cassette in accordance with FIG. 5 to the test, one monitors, with any measuring and recording devices well-known in the art, the variations of the attenuation of the optical signal coming out of the fiber, at the end of each of the eight fibers $4_1$, of the optical component 2 located in the cassette. This optical signal results obviously from the transmission by the coupler 2 of part of an optical signal of wavelength 1550 nm that has been directed into the coupler by the fiber 3.

The various attenuations, in decibels, monitored at the end of the eight fibers have been represented in broken lines. One notices that they remain between −0.2 dB and +0.2 dB. These insertion losses which incorporate notably the losses by microcurvatures in the end 5 of the bundle of tubes, are considered as tolerable, and are to be compared to losses of 1 dB noted on cassettes not perfected by the present invention, with the wavelength mentioned above.

It will be noticed that the use of rigid tubes in place of flexible tubes would also have permitted to lower the curvature losses. As such rigid tubes are more expensive than flexible tubes, the invention permits to achieve the same result in an especially economical way.

Of course rite invention is not limited to the embodiment described and represented herein which has only been given as example. Thus the invention extends to the attachment on any support of a bundle of optical fibers within protecting tubes; and in the case of a cassette-shaped support, to cassettes containing any kind of optical components with fibers, and not only to integrated optical components.

I claim:

1. A cassette for an optical fiber device equipped with a bundle (6) of flexible tubes ($11_i$) protecting fibers (3, $4_i$) extending out of the cassette (1), and with means to attach an end of this bundle onto the cassette, characterized in that the cassette comprises a means (13) constituted by a hardened adhesive product filling the gaps between the tubes ($11_i$) to rigidify this end of the bundle of tubes following a stable geometrical configuration suitable for withstanding mechanical bending capable of generating curvature losses for optical signals transmitted through the fibers.

2. A cassette for an optical fiber device equipped with a bundle (6) of flexible tubes ($11_i$) protecting fibers (3, $4_i$) extending out of the cassette (1), and with means to attach an end of this bundle onto the cassette, characterized in that a drop (7) of a hardened adhesive product attaches each fiber (3, $4_i$) in its protecting tube ($11_i$), at the end of the bundle (6) of tubes, and in that the cassette comprises a means (13) to rigidify this end of the bundle of tubes following a stable geometrical configuration suitable for withstanding mechanical bending capable of generating curvature losses for optical signals transmitted through the fibers.

3. A cassette for an optical fiber device equipped with a bundle (6) of flexible tubes ($11_i$) protecting fibers (3, $4_i$) extending out of the cassette (1), and with means to attach an end of this bundle onto the cassette, characterized in that the end (5) of the bundle of tubes is inserted into a protective sleeve (8) glued on the inside to the bundle and on the outside to a predetermined surface (12) of the cassette (1), and in that the cassette comprises a means (13) to rigidify this end of the bundle of tubes following a stable geometrical configuration suitable for withstanding mechanical bending capable of generating curvature losses for optical signals transmitted through the fibers.

4. A cassette according to claim 3, characterized in that the surface (12) is approximately planar and does not comprise any indentation.

5. A cassette according to claim 1, 2 or 3, characterized in that this stable configuration takes the form of a compact arrangement of tubes ($11_i$) inplanar beds.

6. A cassette according to claim 1, 2 or 3, characterized in that at least one planar strap ($9_i$) rests against a planar surface of the rigidified end of the bundle (6) of tubes, in order to contribute to the attachment of this end to the cassette, without bending this end.

7. A cassette according to claim 6, characterized in that these straps ($9_i$) rest against walls ($10_1$, $10_2$) of the cassette in order to be flush with the surface of the end of the bundle (6) of tubes.

8. A cassette according to claim 1, 2 or 3, characterized in that this stable configuration takes the form of a compact arrangement of tubes ($11_i$) in superposed planar beds.

* * * * *